June 19, 1951 — N. K. SHIGAKI — 2,557,240
FISH NET
Filed Oct. 26, 1948
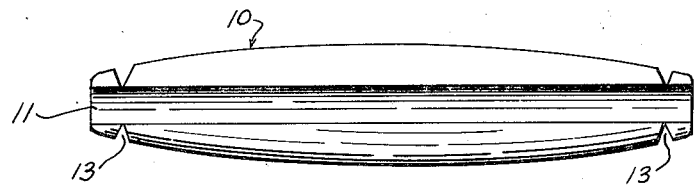
FIG. 1.
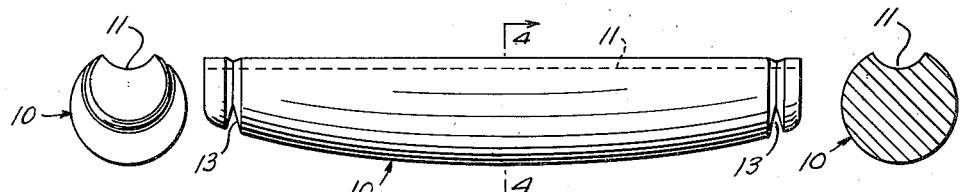
FIG. 2.
FIG. 3.   FIG. 4.
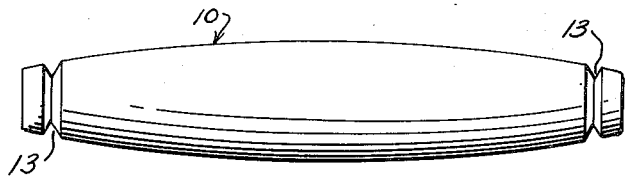
FIG. 5.
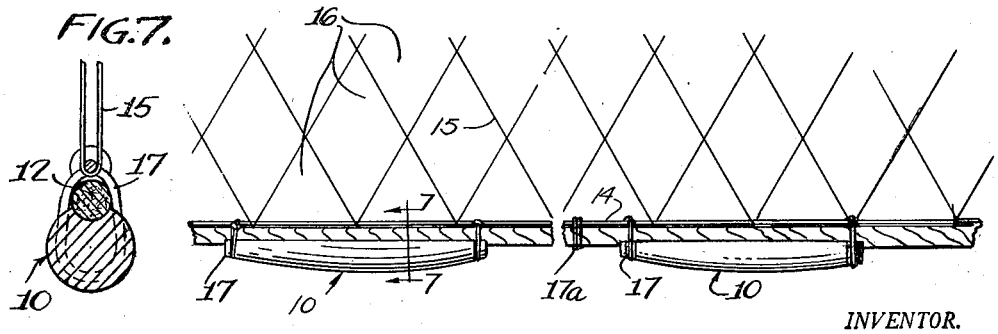
FIG. 7.   FIG. 6.
INVENTOR.
NEIL K. SHIGAKI,
BY
McMorrow, Berman & Davidson
ATTORNEYS.

Patented June 19, 1951

2,557,240

UNITED STATES PATENT OFFICE 2,557,240

FISH NET

Neil K. Shigaki, Honolulu, Territory of Hawaii

Application October 26, 1948, Serial No. 56,557

3 Claims. (Cl. 43—7)

This invention relates to fish nets, and more particularly to fish nets having sinkers, or sinkers and floats attached thereto.

It is among the objects of the invention to provide an improved fish net having sinkers, or sinkers and floats secured to the main line or lines of the net by the shuttle line which secures the mesh of the net to a main line, in the provision of improved sinkers that are easily attached to the main line at the same time the mesh is attached thereto, which sinkers do not require a specific size of main line for an exact fit and do not require any threading of the main line through any definite number of sinkers nor any enlargement of the holes or clinching of the sinkers onto the main line nor necessitate accurate spacing of the sinkers according to the mesh count of the net, and which sinkers lie closely along the main line of the net and are so contoured as to eliminate any possibility of becoming entangled in the net, are detachable if caught by underwater obstructions without breaking or tearing the net, and are simple and durable in construction, and economical to manufacture.

Other objects and advantages will become apparent from a consideration of the following description and the appended claims in conjunction with the accompanying drawing, wherein—

Figure 1 is a top plan view of a fish net sinker, illustrative of the invention;

Figure 2 is a side elevation of the sinker illustrated in Figure 1;

Figure 3 is an end elevation of the sinker illustrated in Figures 1 and 2;

Figure 4 is a transverse cross-section taken substantially on the line 4—4 of Figure 2;

Figure 5 is a bottom plan view of the sinker illustrated in Figures 1 and 2;

Figure 6 is an elevation of a fragmentary portion of a fishing net showing the application of an improved sinker thereto; and Figure 7 is a transverse cross sectional view on the line 7—7 of Figure 6.

With continued reference to the drawing, the improved net sinker, generally indicated at 10, is an elongated body of heavy metal, such as lead. This body is of generally circular cross-sectional shape and has one straight side or edge in which is provided a longitudinally-extending groove 11 which is transversely curved and of a size to receive at least a portion of the main line 12 of a fish net. The body is convexly tapered from its mid-length location to both ends and is smoothly rounded to provide a streamlined shape which is easy to throw and manipulate in the water and which will eliminate any possibility of the sinkers becoming entangled in the net.

For types of nets which stand vertically in the water, suitable floats may be provided in exactly the same form as the sinkers above-described, but formed of a buoyant material, such as wood, cork or plastic, and will have the various advantages above-enumerated in connection with the sinkers herein illustrated and described.

The body is provided with two circumferential grooves 13 positioned one near each end of the body which grooves abut, but do not intersect the longitudinally-extending groove 11. The longitudinally-extending groove 11 is of rounded or arcuate cross-sectional shape having a width materially greater than its depth so that a net main line received in this groove will extend diametrically out of the groove for engagement by a line curved about the body and the net main line in the circumferential grooves. The circumferential grooves 13 are preferably of V-shaped cross-section and are materially smaller than the longitudinally-extending groove 11.

In constructing a net, a main line is laid along an edge of the mesh of the net and a shuttle line is then passed through eyes of the mesh and looped at spaced-apart intervals around the main line to secure the main line to the mesh, a clove hitch being preferably used for these loops.

In accordance with the present invention, the sinkers or floats are secured to the corresponding main line by the shuttle line loops which secure the mesh to such main line. The circumferential grooves in the float or sinker bodies are spaced apart a distance corresponding to the distance between adjacent loops of the shuttle line to facilitate attaching the sinkers or floats to the net.

The main line of the net is disposed in the longitudinally-extending groove 11 of a sinker or float body, and a shuttle line 14 is then passed along the main line 12 and around each end of the sinker, the turns of the shuttle line lying substantially within the circumferential grooves 13 of the body, and within the contour of the outer surface of the body so that the line will be protected from abrasion against rocks or other underwater objects. The turns of the shuttle line passed around the ends of the body are secured by a clove knot or hitch 17 and the shuttle line is also passed through eyes 16 of the mesh 15 to attach the mesh to the main line. Between adjacent bodies the shuttle line may be passed around the main line, as indicated at 17a, to provide additional connections between the eyes of the mesh and the main line. The sinker or float bodies are located at properly-spaced intervals along the main line and are secured to the main line of the net in the above-indicated manner at the same time that the mesh is secured to the main line, thereby saving a large amount of time and labor in attaching the sinkers to the net.

As the shuttle line is much lighter than the main line, and therefore, much easier to break, a sinker, if caught by an underwater obstruction, will be broken away from the main line without breaking the main line or tearing the net.

As described above, the mesh is secured to the main line by the shuttle line loops. These loops may be spaced apart any whole number of mesh eyes, as may be desired. Usually the same number of eyes will be included between each two adjacent loops except for the possibility of some adjustment near the ends of the net. Now, since the floats or sinkers are secured to the main line of the net by the shuttle line loops, they may have any desired spacing consistent with the predetermined spacing of such loops. For instance, the space between two adjacent floats or sinkers may be the distance between two adjacent shuttle line loops or may be equal to two or more times the distance between adjacent loops. Also the spacing between the floats or sinkers may be varied to include a larger or smaller number of loop spacings between two adjacent floats or sinkers. It is, therefore, not necessary to have an exact number of floats or sinkers on hand to construct a net of a definite length as the spacing between some of the floats or sinkers can be varied to make the floats or sinkers come out right at the ends of the net, while maintaining a desired, uniform spacing of the floats or sinkers over the greater part of the length of the net.

On the lay or drop nets, both sinkers and floats are used and are attached on the main lines usually from 18 to 24 inches apart, while on the throw nets, sinkers only are used and the spacing of such sinkers is usually from 3 to 6 inches, such spacing being substantially consistent throughout the net. The number of eyes of the mesh to be included from sinker-to-sinker is determined by the maximum spread of the eyes with adjustment of odd eyes, if any, made toward the end of the net.

While the size of the sinkers may be varied in accordance with the type of net to which they are applied, for a conventional throw net lead sinkers approximately three inches in length and three-quarters of an inch in maximum diameter have been found to provide entirely satisfactory results.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fishing net comprising a mesh, a main line disposed along an edge of said mesh, a shuttle line passing through eyes of said mesh and looped about said main line to secure said mesh to said main line, and rigid bodies of elongated shape disposed at spaced intervals along said main line and secured to the latter by the loops of said shuttle line, each of said bodies having a longitudinally-extending groove therein receiving said main line and a circumferential groove near each end receiving corresponding loops of said shuttle line.

2. A fishing net comprising a mesh, a main line disposed along an edge of said mesh, a shuttle line passing through eyes of said mesh and looped about said main line to secure said mesh to said main line, and rigid bodies of elongated shape disposed at spaced intervals along said main line and secured to the latter by the loops of said shuttle line, each of said elongated bodies having a substantially circular cross-sectional shape and one substantially straight side provided with a longitudinally-extending groove to receive the main line and being tapered from its mid-length location toward both ends and having circumferential grooves disposed one near each end to receive corresponding loops of said shuttle line.

3. A fishing net comprising a mesh, a main line disposed along an edge of said mesh, a shuttle line passing through eyes of said mesh and looped about said main line to secure said mesh to said main line, and rigid bodies of elongated shape disposed at spaced intervals along said main line and secured to the latter by the loops of said shuttle line, each of said bodies having a longitudinally-extending groove therein receiving said main line and a circumferential groove near each end receiving corresponding loops of said shuttle line, the distance between the two circumferential grooves in each body corresponding to the distance between adjacent loops of said shuttle line about said main line so that the loops of said shuttle line securing said mesh to said main line will match with the circumferential grooves in said rigid bodies.

NEIL K. SHIGAKI.

REFERENCES CITED

The following references are of record in the file of this patent:

UNITED STATES PATENTS

| Number | Name | Date |
|---|---|---|
| 83,493 | Harper | Oct. 27, 1868 |
| 232,680 | Cammann | Sept. 28, 1880 |
| 476,828 | Seymour | June 14, 1892 |
| 1,368,296 | Sked | Feb. 15, 1921 |
| 1,986,441 | Koepke | Jan. 1, 1935 |
| 2,474,498 | Schwabe | June 28, 1949 |

FOREIGN PATENTS

| Number | Country | Date |
|---|---|---|
| 21,244 | Great Britain | 1897 |
| 37,092 | Switzerland | Dec. 24, 1906 |